United States Patent [19]

Davis

[11] Patent Number: 4,962,969

[45] Date of Patent: Oct. 16, 1990

[54] ADAPTIVE CONTROLLER FOR REGENERATIVE AND FRICTION BRAKING SYSTEM

[75] Inventor: Roy I. Davis, Ypsilanti, Mich.

[73] Assignee: Ford Motor Company, Dearborn, Mich.

[21] Appl. No.: 251,421

[22] Filed: Sep. 30, 1988

[51] Int. Cl.⁵ .............................................. B60L 7/10
[52] U.S. Cl. .................................... 303/3; 188/156; 188/181 T; 303/100; 303/112; 318/371
[58] Field of Search .................. 303/3, 6.01, 9.76, 97, 303/99, 100, 111, 101, 103, 112; 188/156, 159, 160, 181 A, 181 C, 181 T; 180/165; 318/139, 369, 371; 364/426.02

[56] References Cited

U.S. PATENT DOCUMENTS

| | | | |
|---|---|---|---|
| 3,131,975 | 5/1964 | Smith et al. | 303/112 |
| 3,924,902 | 12/1975 | Engle | 303/100 |
| 4,327,414 | 4/1982 | Klein | 303/93 |
| 4,392,202 | 5/1983 | Matsuda | 364/426.02 |
| 4,404,633 | 9/1983 | Goicoechea | 303/93 X |
| 4,538,700 | 9/1985 | Suzuki | 303/100 X |
| 4,550,372 | 10/1985 | Kahrs | 303/3 X |
| 4,576,417 | 3/1986 | Dobner | 303/100 X |
| 4,591,016 | 5/1986 | Matthews | 303/3 X |
| 4,743,074 | 5/1988 | Inoue | 303/100 |
| 4,778,223 | 10/1988 | Inoue | 303/100 |

Primary Examiner—Duane A. Reger
Attorney, Agent, or Firm—Jerome R. Drouillard; Roger L. May

[57] ABSTRACT

A regenerative and friction braking system for a vehicle having one or more roadwheels driven by an electric traction motor includes a driver responsive device for producing a brake demand signal having a magnitude corresponding to the level of braking force selected by the driver and friction and regenerative brakes operatively connected with the roadwheels of the vehicle. A system according to this invention further includes control means for operating the friction and regenerative braking subsystems so that maximum brake torques sustainable by the roadwheels of the vehicle without skidding or slipping will not be exceeded.

19 Claims, 6 Drawing Sheets

ADAPTIVE CONTROLLER FOR REGENERATIVE AND FRICTION BRAKING SYSTEM

The U.S. Government has rights in this invention pursuant to Contract No. DE-AC07-85NV10418, awarded by the U.S. Department of Energy.

BACKGROUND OF THE INVENTION

1. Field of the Invention

This invention relates to a braking system for a vehicle in which both regenerative and friction braking subsystems are used. A system according to this invention will have the capability of adapting to varying road surface conditions because such a system will be able to calculate the maximum torque which the braking system may generate at any particular roadwheel or set of roadwheels, using either the regenerative braking system alone, or both of the systems, without causing skidding or slipping of the roadwheels.

2. Disclosure Information

Anti-lock brake systems, which are sometimes termed "anti-skid", have come into prominence in the automotive world. Designers have devised a number of control algorithms and strategies for preventing braked wheels from slipping or skidding in the event that the available brake torque exceeds the torque capacity of a roadwheel. Various types of anti-lock braking systems (hereinafter "ABS") have been proposed as a solution for specific problems in applying braking systems. U.S. Pat. No. 4,735,279, for example, deals with application of ABS to a 4-wheel drive vehicle. U.S. Pat. Nos. 4,491,919 and 4,652,060 deal with problems associated with diagonally split brake systems in which, for example, the left front and right rear roadwheels are connected in a common braking system. U.S. Pat. Nos. 4,733,921 and 4,740,040 disclose ABS systems useful for controlling vehicles on so-called split coefficient of friction surfaces which may, for example, be encountered where one set of roadwheels e.g., the right wheels of the vehicle, may be on ice, whereas the left set of roadwheels is on dry pavement.

As with most technologies, improvements upon basic concepts abound. Accordingly, U.S. Pat. No. 3,832,009 discloses an ABS including a single evaluation channel for processing wheel speed information from multiple roadwheels. U.S. Pat. No. 4,374,421 is concerned with yet another strategy for controlling the left versus the right wheel on a single axle.

None of the foregoing systems deals with the control issues related to a vehicle having regenerative braking capability in which an electrodrive traction motor is operated both as a motor to thereby drive the vehicle by absorbing energy from a battery, and as a generator to thereby brake the vehicle and to simultaneously convert kinetic energy to electrical energy for a purpose of recharging the traction battery.

U.S. Pat. Nos. 3,621,929 and 4,671,577 deal with the combination of friction and regenerative braking in a vehicle. Neither patent, however, teaches or suggests a system for maximizing regenerative braking while at the same time preventing skidding by wheels braked either regeneratively or by means of friction mechanisms. More specifically, the '929 patent is devoid of any teaching or suggestion that torque created by the braking systems could or should be limited so as to avoid skidding or wheel locking, whereas the '577 patent, although teaching the coordinated use of friction and regenerative braking in the event that wheels braked regeneratively begin slipping, is devoid of any teaching that braking effort produced by the friction and regenerative means could or should be proportioned according to the coefficients of friction present at the various driven and undriven roadwheels. The '577 patent thus provides a braking effort which is developed in the same proportion by friction and regenerative means for all braking rates.

It is an object of the present invention to provide a regenerative friction braking system which is adaptive inasmuch as the present system allows proportioning of brake torques according to the individual coefficients of friction pertaining to each of the brake controlled roadwheels.

It is an advantage of the present invention that a system according to this invention will allow maximum use of regenerative braking without causing locking or skidding of either powered or unpowered roadwheels.

It is a feature of the present invention that a system according to this invention will periodically recalculate the coefficient of friction existing between the roadwheels and road surface so as to generate the capacity for maximum safe brake operation.

Other objects, features and advantages of the present invention will become apparent to the reader of this specification.

SUMMARY OF THE INVENTION

A regenerative and friction braking system for a vehicle having one or more roadwheels driven by an electric traction motor comprises driver responsive means for producing a brake demand signal having a magnitude corresponding to the level of braking force selected by the driver and friction braking means operatively connected with one or more roadwheels of the vehicle. A control means operates both a regenerative braking means operatively connected with an electric traction motor and said friction braking means, with such control means comprising means for periodically determining the maximum brake torque which may be developed by both of said braking means without causing skidding or slipping of the roadwheels and means for calculating brake commands for the friction and regenerative braking means based upon not only the brake demand signal but also upon the determined maximum brake torques, with the result that the determined maximum brake torques will not be exceeded. The means for determining the maximum brake torques which may be sustained by the braking means without causing skidding or slipping of the roadwheels may comprise means for determining the coefficient of friction between at least one of the roadwheels and the surface upon which the vehicle is being operated, as well as means for determining the loading applied to the roadwheels. A separate coefficient of friction may be determined for each roadwheel, or, alternatively, the roadwheels at the front or rear of the vehicle or left or right side, whichever the case may be, can be lumped together for this purpose. Also, a separate coefficient of friction may be determined for at least one of the roadwheels operatively connected with the friction braking means, and at least one roadwheel operatively connected with the regenerative braking means.

A system according to the present invention may be used for calculating brake commands for friction and regenerative braking means such that the brake torque produced by each of said braking means will be less, by an equivalent amount, than the maximum sustainable brake torque value determined for such means. In other words, the braking may be balanced between the friction and the regenerative braking subsystems on separate axles.

A regenerative and friction braking system according to the present invention will preferably provide braking commands to a regenerative braking subsystem such that this subsystem will be commanded to produce the entirety of the desired braking torque corresponding to the brake demand signal in the event that such torque may be developed without exceeding the determined maximum torque for said regenerative subsystem. In the event, however, that the regenerative subsystem is incapable of supplying all of the desired braking torque, each of the braking means will be given commands such that the brake torque produced by each of the braking means or subsystems will be less than the maximum torque value determined for each such means by an equivalent amount.

According to the present invention, a method for operating regenerative and friction braking systems for a vehicle having one or more roadwheels driven by an electric traction motor and with the vehicle having one or more dual-braked roadwheels braked by said regenerative and friction braking subsystems and one or more friction-braked wheels braked only by said friction subsystem, comprises the steps of: producing a brake demand signal having a magnitude corresponding to the level of braking force selected by the driver; determining the maximum brake torques which may be developed by said braking subsystems without causing skidding or slipping of the roadwheels and calculating brake commands for such friction and regenerative braking subsystems based upon the magnitude of the brake demand signal and upon such determined maximum brake torques. Although the torques sustainable by the braking means are frequently referred to in this document, those skilled in the art will appreciate in view of this disclosure that in most cases, the maximum torque is limited by the capacity of the tire to sustain braking torque. Accordingly, the term "maximum brake torque" means the torque which either the brake or the tire and wheel assembly can sustain, whichever is lesser. According to the present method, brake commands may be calculated according to the steps of: computing a desired braking torque from the brake demand signal; comparing the desired braking torque to maximum brake torques determined for each of the roadwheels and in the event that the desired braking torque and the maximum brake torque which such regenerative subsystem is capable of developing exceed the maximum brake torque determined for the dual-braked wheels, commanding the regenerative means to develop a braking torque which is equal to the maximum torque determined for the dual-braked roadwheels, while commanding the friction brake subsystem to develop the remaining portion of the desired braking torque with the friction braked wheels without exceeding the maximum torque determined for the friction braked wheels. In the event, however, that the desired braking torque is less than both the maximum brake torque which the regenerative subsystem is capable of developing and the maximum brake torque determined for the dual braked wheels, the system will command the regenerative braking means to develop a braking torque which equals the desired braking torque. Finally, in the event that the desired braking torque and the maximum brake torque determined for the dual-braked wheels exceed the maximum brake torque which the regenerative subsystem is capable of developing, the control system will command the regenerative braking means to develop maximum braking torque while commanding the friction brake subsystem to develop the remaining portion of the desired braking torque, thereby using both the dual and friction braked roadwheels, without exceeding the maximum torques determined for each of such wheels. In the event that the desired braking torque and the maximum brake torque determined for the dual braked wheels exceed the maximum brake torque which the regenerative subsystem is capable of developing, with the result that the regenerative means is commanded to develop its maximum braking torque and the friction brake system is commanded to develop the remaining portion of the desired braking torque with said dual and said friction braked roadwheels without exceeding the maximum sustainable torques determined for each of the roadwheels, a method according to this invention will determine the brake torque commands for the regenerative and friction braking subsystems such that said subsystems will develop a total brake torque at each roadwheel which is less than the predetermined maximum sustainable torque for such roadwheels by an equivalent amount.

According to the present invention, the means for determining the maximum brake torque which may be sustained by the vehicle's roadwheels without causing skidding or slipping of the roadwheels may comprise means for determining the brake torque at which the roadwheels will decelerate rotationally at a rate which exceeds a deceleration threshold determined by calculating a deceleration rate corresponding to the total brake torque being applied. The maximum brake torques may, therefore, be determined by adjusting the braking forces produced by the friction and regenerative braking means until the deceleration rate of the roadwheels does not exceed the threshold deceleration rate and by calculating a brake torque corresponding to such adjusted brake force. Roadwheel deceleration rate may be determined by sensing the rotational velocity of the roadwheel by taking the time derivative of the sensed velocity.

A friction braking subsystem suitable for use according to the present invention may comprise a master cylinder, a control valve operatively connected with the previously recited control means as well as with said master cylinder, and a wheel brake assembly operatively connected with the control valve.

DETAILED DESCRIPTION OF PREFERRED EMBODIMENTS

Figure 1:
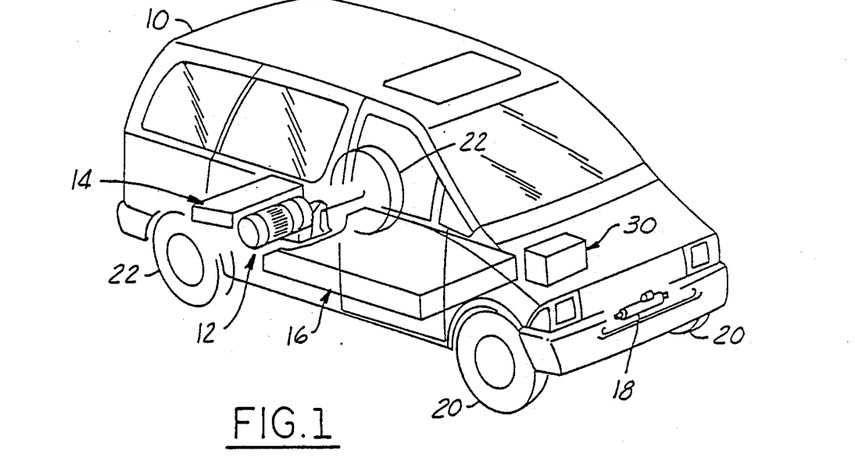
FIG. 1 is a perspective view of a vehicle having a brake system according to the present invention.

FIG. 1 shows a vehicle, 10, which has a braking system according to the present invention. The vehicle is powered by traction motor 12, which is controlled by traction motor operator 14, and which receives power from traction battery 16. The brake system is operated by brake system controller 30, which controls the brakes associated with the front and rear roadwheels 20 and 22 respectively. In conventional fashion, front roadwheels 20 are steered by steering gear 18.

Figure 2:
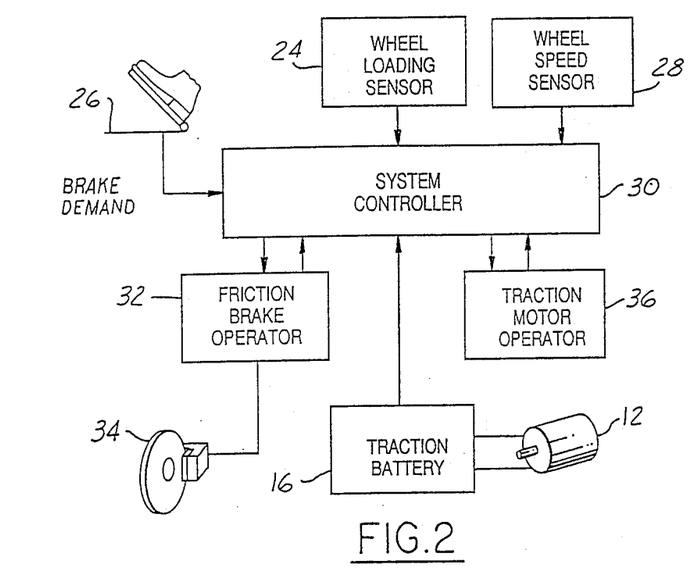
FIG. 2 is a schematic representation of a brake system according to the present invention.
Figure 3:
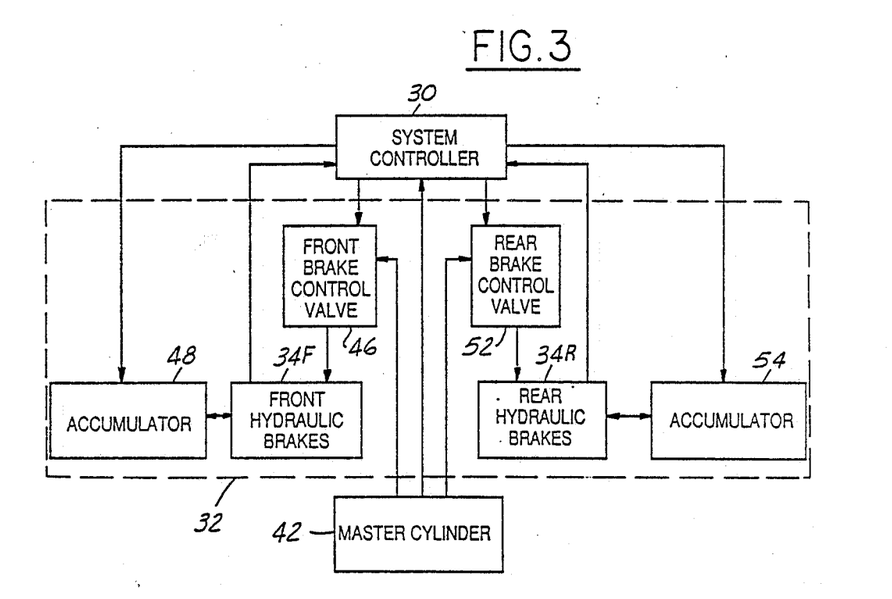
FIG. 3 is a schematic representation of a friction braking subsystem for a brake system according to the present invention.

FIG. 2 illustrates several components of a system according to the present invention. System controller 30 receives input information from wheel loading sensor 24, wheel speed sensor 28 and brake demand sensor 26. In return, system controller 30 outputs signals to friction brake operator 32 and traction motor operator 36, which is operatively connected with traction motor 12 in conventional fashion. Traction motor 12 receives energy from traction battery 16. Further details of friction brake operator 32 are shown in FIG. 3. Master cylinder 42 provides the brake demand input to system controller 30. Master cylinder 42 also provides hydraulic force potential to front brake control valve 46 and rear brake control valve 52. The brake control valves are operated by system controller 30. The front and rear brake control valves are connected with front hydraulic brake 34F and rear hydraulic brake 34R, respectively. The hydraulic brakes are further controlled by accumulator 48 which is connected with front hydraulic brake 34F and accumulator 54 which is connected with rear hydraulic brake 34R. Operation of each of these components will be explained in this specification.

Figure 4:
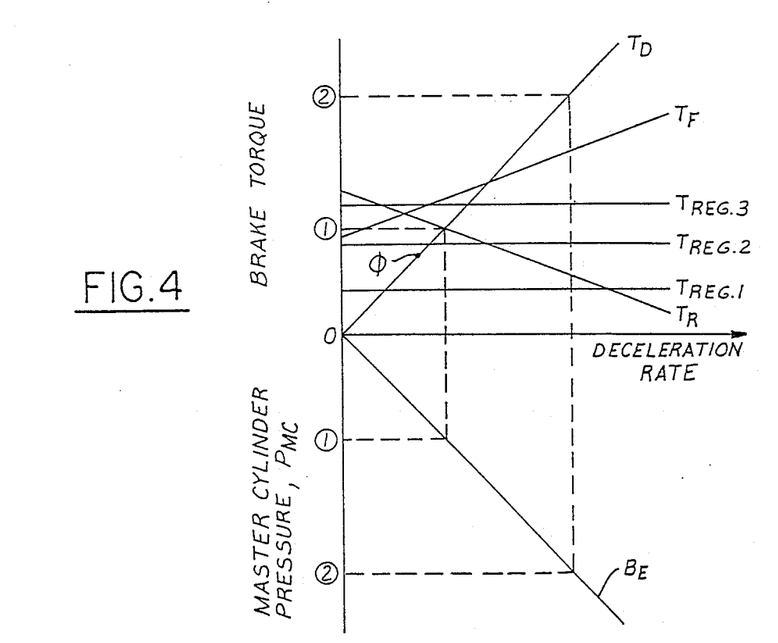
FIG. 4 is an idealized plot illustrating the cooperation between the regenerative and friction braking subsystems of a brake system according to the present inven­tion.

Example 1. FIG. 4 comprises a characteristic plot of a system operating according to the present invention. In FIG. 4, deceleration rate is plotted on the abscissa, with deceleration increasing from left to right. Brake torque is plotted along the upper half of the ordinate, whereas the lower half of the ordinate shows master cylinder pressure, $p_{MC}$, or brake demand. Beginning now with operating line 1—1, in the event that the driver of the vehicle selects master cylinder pressure "1" corresponding to an unspecified but relatively low level of brake torque demand, one may follow the dotted line extending from 1 on the master cylinder pressure portion of the ordinate to line "BE", which stands for brake effort. Following dotted line 1—1 upward from the brake effort line BE to the intersection of line 1—1 with the abscissa, one establishes a desired deceleration rate. Accordingly, the master cylinder pressure, $p_{MC}$ corresponds to a given deceleration rate as selected by the driver. Following the dotted line 1—1 upward further to its intersection with the line $T_D$, which stands for total brake torque demand, and then to its conclusion on the brake torque plot of the ordinate, one sees that master cylinder pressure is directly relatable to a given total torque demand. In similar fashion, the intersections of line 1—1 with the lines labeled $T_R$ and $T_F$, respectively, indicate the maximum sustainable brake torque for the rear axle and the front axle.

In the case of Example 1, it is possible to see that the total brake torque desired by the driver is equal to $T_R$, which corresponds to the maximum brake torque sustainable by the rear axle of vehicle 10. Accordingly, because the total brake torque demanded by the driver is not greater than the total brake torque which may be sustained by the rear axle of the vehicle, it is possible under certain conditions that the regenerative capacity of traction motor 12 could be used to satisfy the total brake demand. Accordingly, three separate plots labeled $T_{REG1}$, $T_{REG2}$ and $T_{REG3}$ are plotted in FIG. 4. Each $T_{REG}$ value corresponds to a given regenerative torque capability of traction motor 12. In general, regenerative torque capability is most strongly influenced by motor speed, and secondarily, by traction battery voltage.

Again with reference to Example 1, in the event that regenerative torque follows the $T_{REG1}$ line of FIG. 4, the regenerative torque will be inadequate to satisfy total demanded brake torque. In this case, system controller 30 will command traction motor operator 36 to cause traction motor 12 to produce maximum regenerative braking, which, of course, will be at the level of $T_{REG1}$. As seen from FIG. 4, torque $T_{REG1}$ is well below $T_D$, in the present example. Consequently, system controller 30 will command friction brake operator 32 which is detailed in FIG. 3, to produce the balance of the required braking torque demand by means of front hydraulic brake 35F and rear hydraulic brake 34R.

In the case presently being discussed, i.e., Example 1 with regenerative torque equal to $T_{REG1}$, because $T_{REG1}$ represents the maximum regenerative torque available from traction motor 12, an amount of torque equal to the vertical distance between the intersection of line 1—1 with line $T_D$ and the intersection of line 1—1 with $T_{REG1}$ must be supplied by the hydraulic braking system. A system according to the present invention will select the hydraulic brake pressures or forces for the front and rear roadwheels such that both sets of wheels will be caused to produce a brake torque which is not only less than the maximum braking torque sustainable for each wheel, or each axle set, as the case may be, but which is also less than such maximum torque by an equal amount. In other words, the hydraulic front friction brakes will be commanded to produce a brake torque which is less than the brake torque represented by the intersection of line 1—1 with line $T_F$ by a given amount. Similarly, the rear hydraulic brakes will be commanded to produce a brake torque which, when added to $T_{REG1}$, is less than the value corresponding to the intersection of line 1—1 with line $T_R$ by the same amount. Accordingly, the front and rear wheels will be an equal distance from their skid or lock-up point, where the "distance" is measured in foot pounds of brake torque before lock-up is reached.

Example 2. Assuming now that line 1—1 is still being used, however, assuming further that traction motor 12 is now operating along the line $T_{REG2}$, it may be seen from FIG. 4 that the traction motor is capable of supplying almost the entire amount of brake torque selected by the vehicle operator because the brake torque indicated by the intersection of the vertical portion of line 1—1 is only slightly greater than the magnitude of torque represented by line $T_{REG2}$ A system according to this invention may be programmed to operate according to two alternatives in this case. In the first case, traction motor 12 may be commanded to produce a torque level equal to $T_{REG2}$ with the balance of brake demand being made up by the front hydraulic brake system. Alternatively, the traction motor could be commanded to produce a torque somewhat less than $T_{REG2}$ so that the brake torque may be more balanced between the front and rear wheels.

Example 3. Assuming once again that line 1—1 represents the operating point of a vehicle braking system according to the present invention, but now assuming that $T_{REG3}$ represents the maximum brake torque which may be developed by traction motor 12, it may be seen from FIG. 4 that $T_{REG3}$ exceeds $T_R$ at the point in question. As a result, the traction motor is capable of producing more brake torque than the rear wheels of the vehicle will be able to sustain without sliding or locking or slipping. As a result, traction motor 12 cannot be commanded to produce the full regenerative torque which would otherwise be possible. In this case, a system according to the present invention may give the command for traction motor 12 to produce torque equal to intersection of line 1—1 with line $T_R$. Thus, the traction motor will produce an amount of brake torque which is equal to the maximum brake torque sustainable by the rear wheels. Because, however, line $T_D$ intersects line $T_R$ at this point, no additional braking will be required. Alternatively, traction motor 12 can be commanded to produce a torque less than that represented by the intersection of lines $T_D$ and $T_R$, with the remaining portion of the torque requirement being produced by the front hydraulic brakes so as to balance braking between the front and rear wheels.

Example 4. The concept of balancing the front and rear brake torques becomes more important in cases where the deceleration rate selected is much higher, as with the example presented by line 2—2 of FIG. 4. Because master cylinder pressure $p_{MC}$ is much greater, which corresponds to the driver's selection of a greater deceleration rate, demanded brake torque $T_D$ is much greater as well. Note here that the level of $T_D$ which is represented by the intersection of the line 2—2 with the ordinate in the brake torque region, exceeds $T_F$, $T_R$ and all of the $T_{REG}$ levels As a result, the desired brake torque can be satisfied only by a combination of regenerative and friction braking. Note also the characteristics of the curves $T_F$ and $T_R$ such that $T_F$ increases with increasing deceleration rate while $T_R$ decreases with increasing deceleration rate. This phenomenon stems from the fact that as deceleration rates increase, the front wheels of the vehicle become progressively more loaded, whereas the rear wheels become progressively less loaded. As a result, the maximum brake torque which the front wheels may sustain increases whereas the maximum brake torque which the rear wheels may sustain decreases concomitantly.

Returning to Example 4, represented by line 2—2 of FIG. 4, one may see that the level $T_{REG1}$ is slightly below the level of TR represented by the intersection of line 2—2 and line $T_R$. As a result, if the traction motor 12 is capable of producing regenerative torque at the level $T_{REG1}$, all of such regenerative torque may be used for the braking process, with the balance made up by the hydraulic front and rear brakes. If, however, traction motor 12 is capable of producing brake torque at levels $T_{REG2}$ or $T_{REG3}$, such brake torque levels would exceed the value for $T_R$ pertaining to the present deceleration rate, and as a result, the regenerative torque output will be limited by system controller 30 and traction motor operator 36 so as not to exceed $T_R$ in any event. For the present example, at all levels of $T_{REG}$ the front hydraulic friction brakes will be employed to supplement the rear axle regenerative braking in order to satisfy the total brake demand.

The determination of discrete values for $T_D$, $T_F$, and $T_R$ corresponding to any particular set of vehicular operating conditions will be explained with reference to the flow diagram of FIG. 5. Turning for the moment however to FIG. 2, system controller 30 comprises a microprocessor having a large scale integrated circuit (LSI) including a ROM in which is stored various constants and a control program for controlling friction brake operator 32 and traction motor operator 36. The microprocessor further includes a CpU for reading out control programs from the ROM so as to execute required operations, and a RAM which temporarily stores various data related to the operations to be executed within the CpU and which allows the CpU to read out data stored therein. The microprocessor further comprises a clock generator which generates clock pulses in response to which various operations are executed in the microprocessor and input-output devices for controlling various input-output signals to and from the microprocessor.

Figure 5:
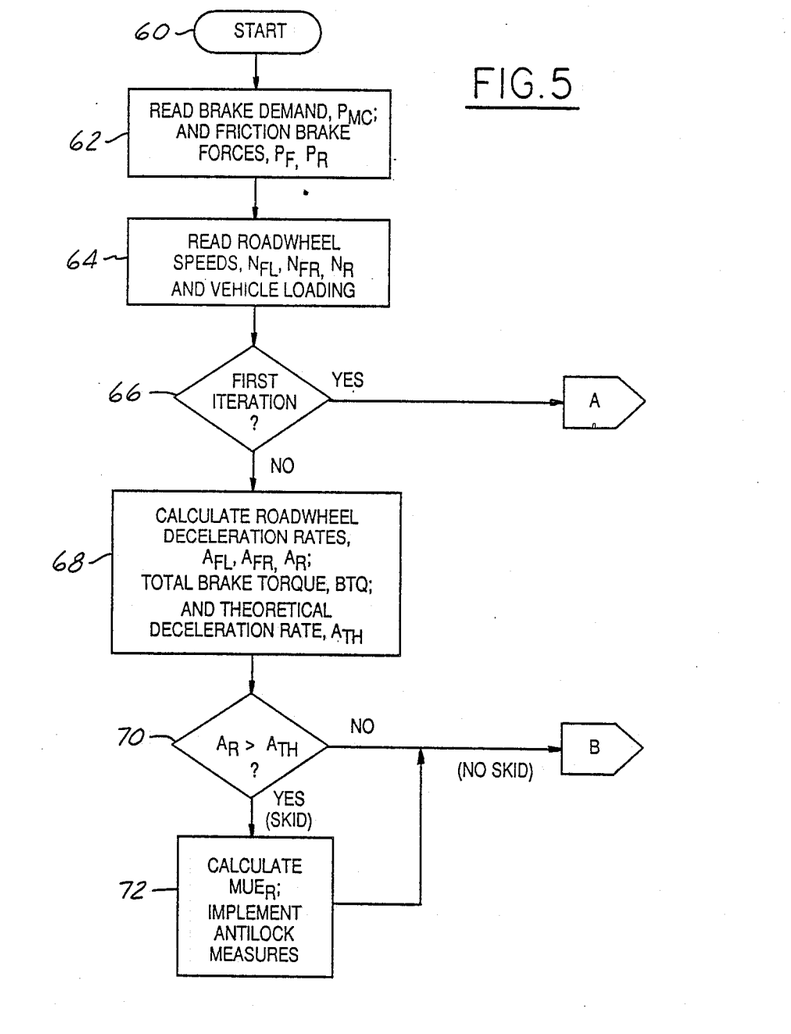
FIGS. 5-8 are flow charts illustrating the operation of a system according to the present invention.
Figure 6:
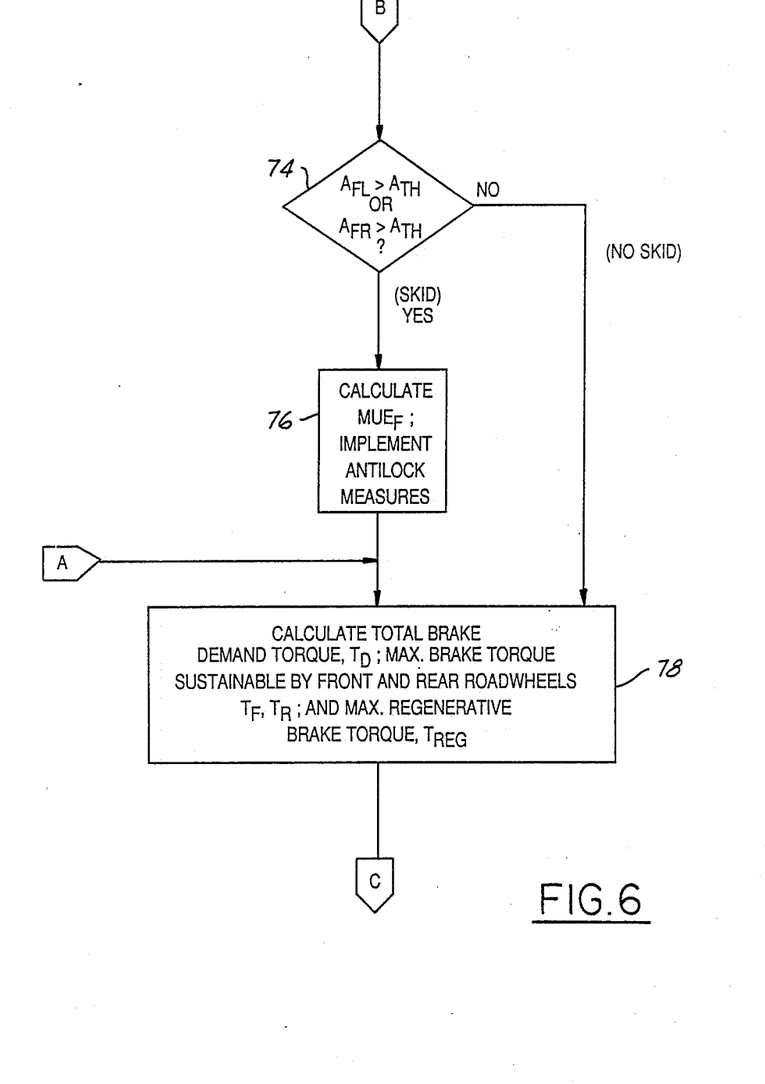
Figure 7:
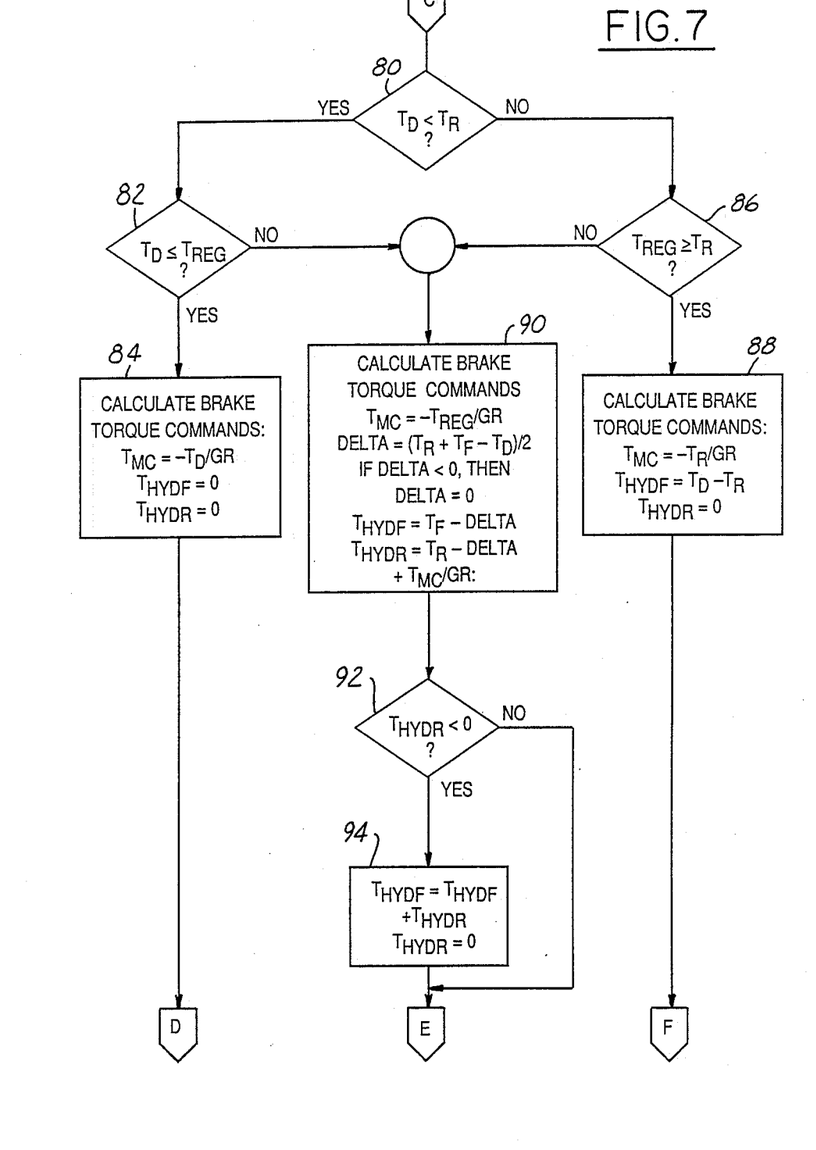
Figure 8:
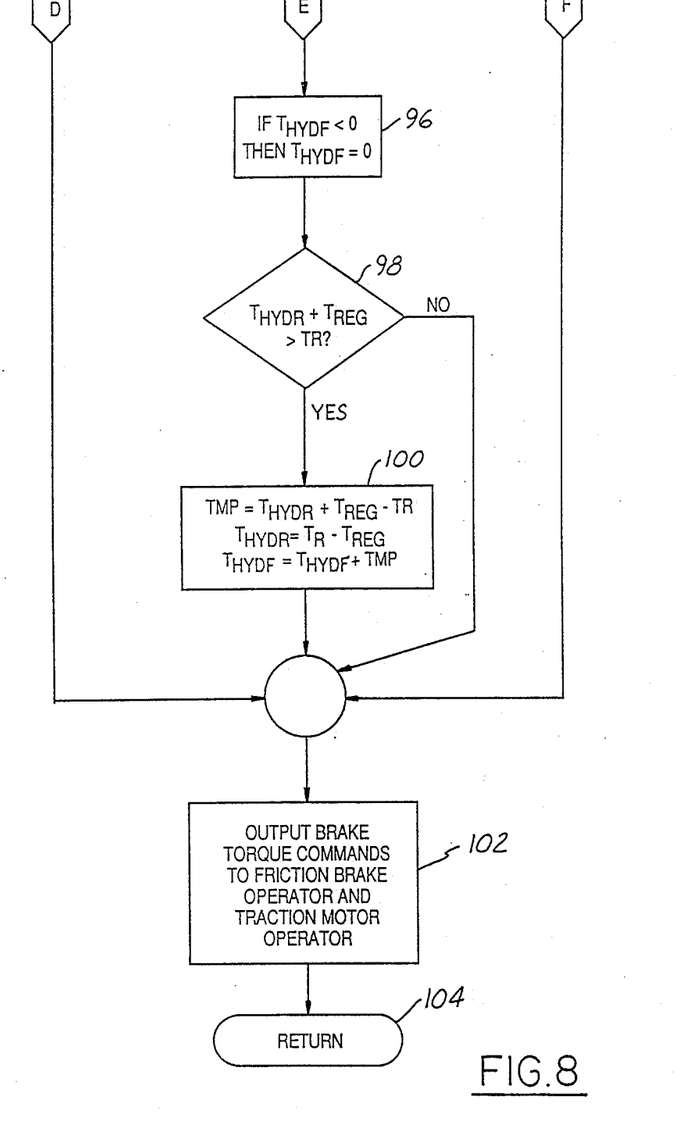

Beginning now at FIG. 5 at block 60, system controller 30 starts operation of the brake system. At block 62 brake demand $p_{MC}$ (FIG. 4) is read by means of brake demand sensor 26 (FIG. 2). Brake demand sensor 26 preferably comprises a pressure sensor related to the hydraulic pressure produced within hydraulic master cylinder 42 which is activated by the vehicle's human driver. Brake demand sensor 26 could, however, comprise other types of sensors known to those skilled in the art and suggested by this disclosure such as a load cell, an air brake treadle and valve, or certain types of rheostats.

Continuing with block 62, friction brake forces $p_F$ and $p_R$ are read. $p_F$ is the hydraulic pressure corresponding to the friction brake force currently being applied to the front wheels of the vehicle, whereas $p_R$ corresponds to the hydraulic pressure force being supplied to the rear hydraulic braking system of the vehicle. Hence the term "friction brake forces" is applied to $p_F$ and $p_R$. $p_F$ and $p_R$ may be measured by a number of means well known to those skilled in the art to which this invention pertains. As shown in FIG. 3, system controller 30 receives pressure signal feedback from front hydraulic brakes 34F and rear hydraulic brake 34R. Those skilled in the art will appreciate in view of this disclosure that the magnitude of the hydraulic pressure acting upon the pistons within the wheel cylinders of hydraulic brake mechanisms is proportional to the brake force produced by the mechanism. Accordingly, the braking forces produced by the front and rear hydraulic brake systems of a vehicle having a system according to the present invention will be known if $p_F$ and $p_R$ are known.

Having read initial data in block 62, the microprocessor moves to block 64, wherein roadwheel speeds $N_{FL}$, $N_{FR}$ and $N_R$ are read. $N_{FL}$ and $N_{FR}$ correspond to the rotational speeds of the left and right front wheels, respectively. Similarly, $N_R$ refers to the rotational speed of the rear wheels of the vehicle. Those skilled in the art will appreciate in view of this disclosure that the system described herein has been simplified insofar as only one sensor is used to determine the rotational speed of the rear wheels of the vehicle. It will be further appreciated that four sensors could be used in the event that the rotational speed of each of the wheels is to be determined independently. Finally, it would be possible to practice the present invention by using only two rotational speed sensors—i.e., one on the front axle and one on the rear axle. Vehicle loading is also determined at block 64. Those skilled in the art will appreciate in view of this disclosure that vehicle loading may influence the amount of brake torque which the roadwheels are capable of developing. U.S. Pat. No. 4,453,778, which is assigned to the assignee of the present invention and which is hereby incorporated by reference into this specification, discloses means for determining wheel loading of the vehicle. Those skilled in the art will appreciate that other means may be used for this purpose.

Having determined the various brake pressures, roadwheel speeds and vehicle loading, the microprocessor program currently under consideration moves to block 66 wherein the program inquires as to whether the system is making its first iteration through the control loop. If the answer is "yes", the program moves to portion A beginning at block 78. If, however, the answer is "no", the program continues with block 68 with the calculation of roadwheel deceleration rates $A_{FL}$, $A_{FR}$ and $A_R$. $A_{FL}$ and $A_{FR}$ correspond to the roadwheel rotational deceleration rates of the left and right front wheels, respectively, whereas $A_R$ corresponds to the rotational deceleration rate of the rear wheels of the vehicle. The deceleration rates are calculated by differentiating wheel rotational speeds with respect to time. In this regard, it should be noted that wheel rotational velocity may be measured by any number of devices including those commonly in use with known anti-lock brake systems. At block 68 the microprocessor further calculates total brake torque, BTQ, and the theoretical vehicular deceleration rate, $A_{TH}$. Total brake torque developed by the vehicle is given by the formula:

$$BTQ = (-T_M * GR) + (P_R * A) + (P_F * B)$$

where:

$T_M$ equals the torque output of the motor as known by the motor speed and currents passing through the motor windings. Motor torque, TM, is shown as being negative because positive motor torque is assumed to accelerate the vehicle in the forward direction.

GR equals gear ratio of the axle drive gears coupled to the motor.

A and B are constants which convert the rear and front brake pressures, respectively, to brake torques.

The theoretical deceleration of the vehicle, measured in terms of the rotational deceleration of the roadwheels as a result of the imposition of total brake torque, BTQ, upon the vehicle, is calculated according to the following equation:

$$A_{TH} = (BTQ * 32.2)/(W * R^2)$$

where:

32.2 equals the gravitational constant.
W equals the weight of the vehicle.
R equals the rolling radius of the roadwheels.

In the event that it is desired to apply a system according to the present invention without the use of discrete load sensing, $A_{TH}$ may be broadened to include a tolerance band to account for expected variations in loaded vehicle weight.

Continuing at block 70, system controller 30 compares the magnitude of $A_R$ to the magnitude of $A_{TH}$. In the event that the magnitude of $A_R$ is less than the magnitude of $A_{TH}$, the program transfers to point B and continues with block 74. If, however, $A_R$ exceeds $A_{TH}$, this indicates that a skid is either occurring or is imminent because the rear wheels are decelerating rotationally at a rate which exceeds the normal rate of deceleration equivalent to the brake torque being produced by the braking system of the vehicle. Accordingly, at block 72 system controller 30 calculates $MUE_R$, which is the coefficient of friction between the rear wheels and the road surface. Because a skid condition is imminent, the system controller will implement anti-lock measures as well.

$MUE_R$ is calculated according to the following formula:

$$MUE_R = \frac{L[(P_R * A) + (-T_M * GR)]}{(W * R * D) - (BTQ * H)}$$

where:

L equals the length of the wheel base of the vehicle and D and H represent, respectively, the distance between the center of gravity of the vehicle and the longitudinal center line of the front wheels and the height of the center of gravity over the road surface.

As noted above, at block 72, system controller 30 implements anti-lock measures with respect to the rear axle. Referring now to FIG. 3, system controller 30 gives the command to rear brake control valve 52 to isolate rear hydraulic brake 34R from hydraulic pressure arising from master cylinder 42. System controller 30 will also give a signal to connect accumulator 54 to rear hydraulic brake 34R. The effect of these control commands will be that rear hydraulic brake 34R will receive no additional brake fluid from master cylinder 42; moreover, the hydraulic pressure existing within the cylinder of rear hydraulic brake 34R will be partially dissipated by the connection of accumulator 54 to the cylinder. As a result, the rear roadwheels will be given an opportunity to accelerate their rotational speeds and thereby move away from the skid threshold.

Continuing now at block 74 of FIG. 5, the microprocessor inquires as to the rotational speeds of the front wheels. In similar fashion to that previously described with respect to the rear wheels, in the event that either $A_{FL}$ or $A_{FR}$ is greater than $A_{TH}$, this indicates that a skid is present; if such is the case, the microprocessor moves to block 76 to immediately calculate $MUE_F$ and to implement anti-lock measures with respect to the front axle. If, however, a skid is not detected by virtue of the fact that $A_{FL}$ and $A_{FR}$ are less than $A_{TH}$, the microprocessor continues to block 78. At block 76 $MUE_F$ is calculated according to the following equation:

$$MUE_F = \frac{P_F * B * L}{(W * R * C) + (BTQ * H)}$$

where:

C equals distance between the center of gravity of the vehicle and the horizontal centerline of the rear wheels.

The anti-lock measures taken at block 76 for the front axle of the vehicle correspond to those taken at block 72 for the rear axle. Accordingly, system controller 30 will give an appropriate command to front brake control valve 46 and accumulator 48 to isolate the wheel cylinders of front hydraulic brakes 34F from master cylinder 42 and to reduce the pressure within the front hydraulic brake cylinders by coupling the volume of accumulator 48 thereto. As a result, the front roadwheels will be allowed to increase their rotational velocity to move away from the skidding or locking regime.

At block 78, system controller 30 uses the previously calculated values of $MUE_F$ and $MUE_R$ to calculate $T_F$ and $T_R$, which are the maximum brake torque sustainable by the front and rear axles. $T_F$ and $T_R$ are calculated according to the following formulae:

$$T_F = R * MUE_F * W\left(C + \frac{BTQ * H}{W * R}\right)$$

$$T_R = R * MUE_R * W\left(D - \frac{BTQ * H}{W * R}\right)$$

Brake demand torque, $T_D$, is calculated at block 78 by means of the equation:

$$T_D = X * P_{MC}$$

where:
X equals a constant for converting $P_{MC}$ to total brake torque demand.

Finally, $T_{REG}$ is determined by using a look-up table contained in the ROM, in which the independent variables are motor speed and battery voltage. The reader will recall that $T_{REG}$ corresponds to the maximum regenerative brake torque available from the motor.

Having made the calculations in block 78, the computer continues to block 80 wherein $T_D$, total demand torque specified by the driver, is compared to $T_R$, the total torque available at the rear roadwheels. In the event that $T_D$ is less than $T_R$, this signifies that the total brake torque sought by the driver is less than the maximum brake torque which may be generated by the rear axle of the vehicle. In the event that $T_D$ is less than $T_R$, the microprocessor transfers to block 82, wherein $T_D$ is compared to $T_{REG}$. If TD is less than or equal to $T_{REG}$, this indicates that the total torque demand specified by the driver is less than the regenerative torque capacity at the particular operating point in question. As a result, the point of operation could be, for example, from FIG. 4 at line 1-1, with $T_{REG3}$ specifying the regenerative torque available from traction motor 12. As a result, at block 84 the computer will calculate brake torque commands such that the motor torque command $T_{MC}$, which follows the convention of being negative in the event that it is desired to operate the motor regeneratively, will be determined according to the following equation:

$$T_{MC} = -T_D/GR$$

At this point, $T_{HYDF}$ and $T_{HYDR}$ will be set equal to zero. These variables correspond to the hydraulic brake torques desired from the front and rear axles, respectively. Of course, in the present case, the total torque demand is capable of being satisfied by the motor operating regeneratively, while not exceeding the torque capability of the rear axle. As a result, there is no reason to employ hydraulic braking.

The case where $T_D$ is less than $T_R$ but greater than $T_{REG}$ is handled at block 90 wherein brake torque demands are calculated as follows:

$$T_{MC} = -T_{REG}/GR$$

Because $T_D$ is less than $T_R$, and because $T_D$ is greater than $T_{REG}$, this situation could correspond to operating point $\Phi$ found in FIG. 4 in the event that $T_{REG1}$ is equal to the maximum regenerative torque. In this case, all of the regenerative torque could be utilized without exceeding the maximum torque capability of the rear axle. As a result, the strategy will apply front and rear hydraulic brakes in such fashion that both the front rear roadwheels will be operated at a substantially equivalent distance away from their skid points, where as before, equivalence is measured in terms of brake torque. As shown in block 90, the value of DELTA is calculated according to the following equation:

$$DELTA = (T_R + T_F - T_D)/2$$

Accordingly, DELTA corresponds to the average difference between $T_D$ and the sum of $T_R$ and $T_F$. DELTA is employed to calculate $T_{HYDF}$ and $T_{HYDR}$ according to the following equations:

$$T_{HYDF} = T_F - DELTA$$

$$T_{HYDR} = T_R - DELTA + T_{MC}/GR$$

After determining values for the hydraulic brake operating points, the microprocessor compares the value of $T_{HYDR}$ to zero at block 92. If $T_{HYDR}$ is less than zero, this indicates that an excessive amount of torque is being called for with the rear axle. Accordingly, at block 94 a new value of $T_{HYDF}$ is calculated as the sum of $T_{HYDF}$ and $T_{HYDR}$. This shifts the hydraulic braking entirely to the front wheels. At the same time, $T_{HYDR}$ is set equal to zero, thereby canceling any hydraulic braking by the rear wheels.

The calculations done in blocks 90-94 also apply to the instance wherein $T_D$ is greater than $T_R$ and $T_{REG}$ is less than $T_R$. Continuing now at block 96, in the event that $T_{HYDF}$ is less than zero, then $T_{HYDF}$ is set equal to zero. At block 98 the microprocessor compares the sum of $T_{HYDR}$ and $T_{REG}$ to $T_R$. If the sum exceeds $T_R$, this indicates that the hydraulic plus regenerative torque exceeds the brake torque sustaining capacity of the rear axle. As a result, the rear brake torque must be recalculated, and this is done at block 100, wherein TMP, a calculation variable, is determined as follows:

$$TMP = T_{HYDR} + T_{REG} - T_R;$$

$$T_{HYDR} = T_R - T_{REG};$$

$$T_{HYDF} = T_{HYDF} + TMP.$$

In the case where both $T_D$ and $T_{REG}$ are greater than $T_R$, the computer program moves from block 86 to block 88, wherein the brake torque demands are calculated according to the following equations:

$$T_{MC} = T - T_R/GR;$$

$$T_{HYDF} = T_D - T_R;$$

$$T_{HYDR} = 0$$

This case corresponds to Example 2—2 of FIG. 4 where either $T_{REG2}$ or $T_{REG3}$ are the available regenerative torques. As previously explained, in this case, the total regenerative torque capacity of the axle cannot be utilized because that capacity exceeds the total torque capacity of the rear axle. Thus, in order to utilize maximum regenerative capacity, the total torque capacity of the rear axle will be absorbed by the traction motor and hydraulic braking force will applied only to the front axle of the vehicle.

All three branches of the strategy shown in blocks 84, 88 and 90-100 converge at block 102 wherein system controller 30 outputs brake torque commands to friction brake operator 32 and traction motor operator 36. Friction brake operator 32 produces the desired torque commands by converting the required torques to brake system pressures and by operating the front and rear brake control valves 46 and 52 and accumulators 48 and 54 to increase and decrease the front and rear hydraulic brake pressures. As previously described, the pressures will be decreased by isolating master cylinder 42 from the front and rear hydraulic brakes 34F and 34R and by coupling accumulators 48 and 54 with the wheel cylinders. Conversely, brake pressure will be increase by isolating accumulators 48 and 54 from their respective brake assemblies and by opening front and rear control valves 46 and 52. Traction motor operator 36 operates traction motor 12 to produce the desired regenerative braking torque by controlling the current within the motor according to any of the several methods known to those skilled in the art and suggested by this disclosure.

At block 104 the algorithm returns to block 60. The various calculations described herein will then be reiterated; in the event that the roadwheel rotational deceleration rates $A_{FL}$, $A_{FR}$ and $A_R$ are in excess of $A_{TH}$, new values for $MUE_R$ and $MUE_F$ will be calculated. Then, the remainder of the algorithm will be completed. These periodic recalculations will continue until the roadwheels have been moved away from an incipient skidding or locking regime. It will thus be understood that the maximum sustainable braking torque is determined by adjusting the brake torques produced by the braking subsystems until the threshold deceleration rate is not exceeded. The brake torques are adjusted by modulating the motor torque command and the hydraulic torque commands until the roadwheels are being braked at a rate which is less than the threshold deceleration rate.

Those skilled in the art will appreciate in view of this disclosure that, according to the dictates of a particular vehicle for which a system according to the present invention is being implemented, separate coefficients of friction can be calculated for each of the roadwheels of the vehicle. Alternatively, it is possible to calculate a separate coefficient of friction for only one of the front roadwheels or one of the rear roadwheels.

From the foregoing description it may be seen that the present system incorporates a method for operating regenerative and friction braking subsystems for a vehicle in which the first step includes producing a brake command signal having a magnitude corresponding to the level of braking force selected by the driver, followed by the step of determining maximum brake torques which may be developed by the friction and regenerative braking systems without causing skidding or slipping of the roadwheels of the vehicle and, finally, calculating brake commands for the friction and regenerative braking systems based upon the magnitude of the brake command signal and upon the determined maximum brake torques. In the event that the desired braking torque selected by the driver and the maximum brake torque which the regenerative subsystem is capable of developing exceed the maximum sustainable brake torque determined for the rear wheels, the traction motor brake torque will be set equal to the maximum torque determined for the rear axle and the front wheel hydraulic brakes will develop the remaining portion of the desired brake torque without exceeding the maximum torque determined for the front wheels.

Various modifications and variations will no doubt occur to those skilled in the various arts to which this invention pertains. All such variations and modifications which basically rely on the teachings through which this disclosure has advanced the art are properly considered within the scope of this invention as defined by the appended claims.

I claim:

1. A regenerative and friction braking system for a vehicle having one or more roadwheels driven by an electric traction motor, comprising:

driver responsive means for producing a brake demand signal having a magnitude corresponding to the level of braking force selected by the driver;

friction braking means operatively connected with one or more roadwheels of said vehicle;

regenerative braking means operatively connected with said electric traction motor; and control means for operating said friction braking means and said regenerative braking means, with said control means comprising:

means for periodically determining the maximum brake torques which may be developed by both of said braking means without causing skidding or slipping of said roadwheels, said means including means for determining the coefficient of friction between at least one of said roadwheels and the surface upon which said vehicle is being operated; and means for calculating brake commands for said friction and regenerative braking means based upon said brake demand signal and upon said determining maximum brake torques, such that said determined maximum brake torques will not be exceeded.

2. A regenerative and friction braking system for a vehicle according to claim 1, wherein said means for determining the maximum brake torques which may be developed by said braking means without causing skidding or slipping of said roadwheels comprises means for determining the loading applied to each of said roadwheels.

3. A regenerative and friction braking system for a vehicle according to claim 2, wherein said means for determining the coefficient of friction between said roadwheels and the surface upon which said vehicle is being operated determines a separate coefficient of friction for each of said roadwheels.

4. A regenerative and friction braking system for a vehicle according to claim 2, wherein said means for determining the coefficient of friction between said roadwheels and the surface upon which said vehicle is being operated determines a separate coefficient of friction for at least one of said roadwheels operatively connected with said friction braking means and at least one roadwheel operatively connected with said regenerative braking means.

5. A regenerative and friction braking system for a vehicle according to claim 2, wherein said means for determining the coefficient of friction between said roadwheels and the surface upon which said vehicle is being operated comprises means for causing said braking means to apply a braking torque to at least one of said roadwheels and means for observing the rotational deceleration of said roadwheel in response to said brake application.

6. A regenerative and friction braking system for a vehicle according to claim 1, wherein said means for calculating brake commands for said friction and regenerative braking means based upon said brake demand signal and upon said determined maximum brake torques calculates said commands so that the brake torque produced by each of said braking means will be less than the maximum torque value determined for such means by an equivalent amount.

7. A regenerative and friction braking system for a vehicle according to claim 1, wherein said means for calculating brake commands for said friction and regenerative braking means based upon said brake demand signal and upon said determined maximum brake torques calculates said commands so that said regenerative braking subsystem will be commanded to produce the entirety of the desired braking torque corresponding to the brake demand signal in the event that such torque may be developed without exceeding the determined maximum torque for said regenerative subsystem, but that in the event that said regenerative subsystem is incapable of supplying all of the desired braking torque, each of said braking means will be given commands such that the brake torque produced by each of said braking means will be less than the maximum torque value determined for each such means by an equivalent amount.

8. A method for operating regenerative and friction braking subsystems for a vehicle having one or more roadwheels driven by an electric traction motor, with said vehicle having one or more dual-braked roadwheels braked by said regenerative and said friction braking subsystems and one or more friction-braked wheels braked only by said friction subsystem, comprising:
producing a brake demand signal having a magnitude corresponding to the level of braking force selected by the driver;
determining the coefficient of friction between at least one of said roadwheels and the surface upon which the vehicle is being operated;
determining the maximum brake torques which may be developed by said braking systems without causing skidding or slipping of said roadwheels; and
calculating brake commands for said friction and regenerative braking systems based upon the magnitude of said brake demand signal and upon said determined maximum brake torques.

9. A method for operating regenerative and friction braking subsystems according to claim 8, wherein said brake commands are calculated according to the steps of:
computing a desired braking torque from said brake demand signal;
comparing said desired braking torque to said maximum brake torques determined for said roadwheels; and
in the event that said desired braking torque and the maximum brake torque which said regenerative subsystem is capable of developing exceed the maximum brake torque determined for said dual-braked wheel, commanding said regenerative means to develop a braking torque which is equal to the maximum torque determined for said dual-braked roadwheel, while commanding said friction-brake subsystem to develop the remaining portion of said desired braking torque with said friction-braked wheel without exceeding the maximum torque determined for said friction-braked wheel;
in the event that said desired braking torque is less than both the maximum brake torque which said regenerative subsystem is capable of developing and the maximum brake torque determined for said dual-braked wheel, commanding said regenerative means to develop a braking torque which equals the desired braking torque;
in the event that said desired braking torque and the maximum brake torque determined for said dual-braked wheel exceed the maximum brake torque which said regenerative subsystem is capable of developing, commanding said regenerative means to develop maximum regenerative braking torque, while commanding said friction-brake subsystem to develop the remaining portion of said desired braking torque with said dual and said friction-braked roadwheels without exceeding the maximum sustainable torques determined for each of said wheels.

10. A method for operating regenerative and friction braking subsystems according to claim 9, wherein in the event that said desired braking torque and the maximum brake torque determined for said dual-braked wheel exceed the maximum brake torque which said regenerative subsystem is capable of developing, with the result that said regenerative means is commanded to develop maximum braking torque, and said friction-brake subsystem is commanded to develop the remaining portion of said desired braking torque with said dual and said friction-braked roadwheels without exceeding the maximum torques determined for each of said wheels, said method will determine said brake torque commands for said regenerative and said friction braking subsystems such that each of said subsystems will develop a brake torque at each roadwheel which is less than the predetermined maximum torque for each roadwheel by an equivalent amount.

11. A regenerative and friction braking system for a vehicle having one or more powered roadwheels driven by an electric traction motor and one or more unpowered roadwheels, comprising:
driver responsive means for producing a brake demand signal having a magnitude corresponding to the level of braking force selected by the driver;
friction braking means operatively connected with one or more of said unpowered roadwheels and with one or more powered roadwheels of said vehicle;
regenerative braking means operatively connected with said electric traction motor; and
control means for operating said friction braking means and said regenerative braking means, with said control means comprising:
means for determining the maximum brake torques which may be sustained by said roadwheels without causing skidding or slipping of said roadwheels, said means including means for determining the coefficient of friction between at least one of said roadwheels and the surface upon which said vehicle is being operated; and means for calculating brake commands for said friction and regenerative braking means based upon said brake demand signal and upon said determined maximum brake torques, such that said determined maximum brake torques will not be exceeded.

12. A regenerative and friction braking system according to claim 11, wherein said means for determining the maximum brake torques which may be sustained by said roadwheels without causing skidding or slipping of said roadwheels comprises means for determining the brake torque at which each of said roadwheels will decelerate rotationally at a rate which exceeds a periodically computed deceleration threshold.

13. A regenerative and friction braking system according to claim 12, wherein said deceleration threshold is determined by calculating a deceleration rate corresponding to the total brake torque being applied by said friction and regenerative braking means.

14. A regenerative and friction braking system according to claim 13, wherein said maximum sustainable brake torques are determined by adjusting the brake torques produced by said friction and regenerative braking means until said threshold deceleration rate is not exceeded.

15. A regenerative and friction braking system according to claim 14, wherein said roadwheel deceleration rate is determined by sensing the rotational velocity of said roadwheel and by taking the time derivative of the sensed velocity.

16. A regenerative and friction braking system according to claim 11, wherein said means for calculating brake commands for said friction and regenerative braking means based upon said brake demand signal and upon said determined maximum brake torques is programmed to balance the brake torques produced by said roadwheels.

17. A regenerative and friction braking system according to claim 16, wherein said brake torques are balanced so that each of said roadwheels is commanded to produce an individualized brake torque which is less than the maximum no-skid brake torque for that particular wheel by an amount which is the same for every roadwheel.

18. A regenerative and friction braking system according to claim 11, wherein said friction braking means comprises:
a master cylinder;
a control valve operatively connected with said control means and said master cylinder; and
a wheel brake assembly operatively connected with said control valve.

19. A regenerative and friction braking system according to claim 18, wherein said friction braking means further comprises a brake fluid accumulator operatively connected with said wheel brake assembly.

* * * * *